United States Patent [19]

Scheele et al.

[11] Patent Number: 5,059,945
[45] Date of Patent: Oct. 22, 1991

[54] REMOTE ALARM MODULE AND ALARM SYSTEM

[75] Inventors: Michael R. Scheele; Max R. Ginther, both of Fort Wayne, Ind.

[73] Assignee: Allen Protection Services, Inc., Fort Wayne, Ind.

[21] Appl. No.: 517,432

[22] Filed: May 1, 1990

Related U.S. Application Data

[63] Continuation of Ser. No. 206,038, Jun. 13, 1988, abandoned.

[51] Int. Cl.$^5$ .................. B60R 25/00; G08B 13/12
[52] U.S. Cl. .................. 340/426; 340/548; 340/568; 340/428
[58] Field of Search .......... 340/426, 428, 548, 568, 340/659, 660; 200/26, 61.93, 538, 543, 331

[56] References Cited

U.S. PATENT DOCUMENTS

| | | | |
|---|---|---|---|
| 763,386 | 6/1904 | Fitch | 340/548 |
| 1,814,255 | 7/1931 | Loeding | 340/548 |
| 2,571,534 | 10/1951 | Brooks | 200/61.93 |
| 3,450,852 | 6/1969 | Rhodes | 340/548 X |
| 3,815,088 | 6/1974 | Kumpfbeck | 340/428 |
| 3,831,141 | 8/1974 | Bowman | 340/428 |
| 4,038,635 | 7/1977 | Schotz | 340/428 |
| 4,698,615 | 10/1987 | Wilber | 340/568 X |

Primary Examiner—Herbert Goldstein
Assistant Examiner—Brian R. Tumm
Attorney, Agent, or Firm—Lundy & Walker

[57] ABSTRACT

A remote alarm module and an alarm system. The remote alarm module has a base which defines a passage. A transient generator is joined to the base. The transient generator is generally non-conducting of electricity after transmission of a single electric transient following the connection of the transient generator to an electrical circuit. A switch has a body and a lever. The body is joined in rigid relationship to the base. The switch has a first terminal and a second terminal. The first terminal is connected electrically in series with the transient generator. The lever has an inner end and an outer end. The inner end is pivotably connected to the body. The outer end has a line receiver. The line receiver adjoins the passage. The lever pivots between a second position, in which the terminals are electrically isolated from each other and a first position, in which the terminals are in electrically conductive relationship.

22 Claims, 2 Drawing Sheets

REMOTE ALARM MODULE AND ALARM SYSTEM

This is a continuation of co-pending application Ser. No. 07/206,038 filed on June 13, 1988, now abandoned.

BACKGROUND OF THE INVENTION

The invention relates to alarm systems and components thereof and more particularly relates to a remote alarm module for use with a vehicular type alarm system and to an improved alarm system including one or more such remote alarm modules.

Vehicle type alarm systems are alarm systems that, at least in part, detect electric transients, in a monitored electrical system, generated by, for example, such activities as starting the engine or opening a door which activates a courtesy light. The electrical system may be that of a vehicle or boat or other utilizer of an independent direct current electrical system. The alarm system may protect against intrusion or theft or may monitor other conditions.

In addition to a transient detector, the alarm unit of a vehicle type alarm system may also include a motion sensor for detecting abrupt motion, such as attempts to pry into the vehicle. Alternative alarm systems having separate sensor-switches for each door or other site, wired on a dedicated circuit to a control unit, are not preferred for vehicular use. Such separately wired systems are commonly used for buildings, however, such systems present enormous problems of cost, installation difficulty, power usage, and high failure rate, if used in vehicles.

Vehicle type alarm systems, have proven very successful in preventing both vehicle theft and theft of most vehicle components. A problem exists, however, as to small components on the vehicle exterior, which can be removed without causing enough motion of the vehicle to trigger the alarm system. Such components, for example, are the hood ornaments, currently popular on luxury automobiles. Because of safety requirements, hood ornaments are connected to vehicles by cable and spring arrangements. A hood ornament can be lifted carefully and cut from a vehicle without activating the motion detector of an alarm system. Increasing the sensitivity of the motion detector unacceptably increases the rate of false alarms.

It is therefore highly desirable to provide an improved remote alarm module and an improved alarm system.

It is also highly desirable to provide an improved remote alarm module and an improved alarm system in which the remote alarm module need not be directly connected to the rest of the alarm system but only to the electrical system monitored by the alarm system.

It is also highly desirable to provide an improved remote alarm module and an improved alarm system in which the remote alarm module can detect movement of a hood ornament.

It is also highly desirable to provide an improved remote alarm module and an improved alarm system in which the remote module is connected to a removable item by a line.

It is also highly desirable to provide an improved remote alarm module and an improved alarm system in which a plurality of the remote alarm modules may be used in conjunction with a transient monitoring alarm unit without modification of the transient monitoring alarm unit.

It is also highly desirable to provide an improved remote alarm module and an improved alarm system combining all the above desired features.

SUMMARY OF THE INVENTION

It is an object of the invention to provide an improved remote alarm module and an improved alarm system.

It is also an object of the invention to provide an improved remote alarm module and an improved alarm system in which the remote alarm module need not be directly connected to the rest of the alarm system but only to the electrical system monitored by the alarm system.

It is also an object of the invention to provide an improved remote alarm module and an improved alarm system in which the remote alarm module can detect movement of a hood ornament.

It is also an object of the invention to provide an improved remote alarm module and an improved alarm system in which the remote module is connected to a removable item by a line.

It is also an object of the invention to provide an improved remote alarm module and an improved alarm system in which a plurality of the remote modules may be used in conjunction with a transient monitoring alarm unit without modification of the transient monitoring alarm unit.

It is finally an object of the invention to provide an improved remote alarm module and an improved alarm system combining all cf the above desired features.

In the broader aspects of this invention there is provided a remote alarm module and an alarm system. The remote alarm module has a base which defines a passage. A transient generator is joined to the base. The transient generator is generally non-conducting of electricity after transmission of a single electric transient following the connection of the transient generator to an electrical circuit. A switch has a body and a lever. The body is joined in rigid relationship to the base. The switch has a first terminal and a second terminal. The first terminal is connected electrically in series with the transient generator. The lever has an inner end and an outer end. The inner end is pivotably connected to the body. The outer end has a line receiver. The line receiver adjoins the passage. The lever pivots between a second position, in which the terminals are electrically isolated from each other and a first position, in which the terminals are in electrically conductive relationship.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings, wherein.

DESCRIPTION OF A SPECIFIC EMBODIMENT

Figure 1:
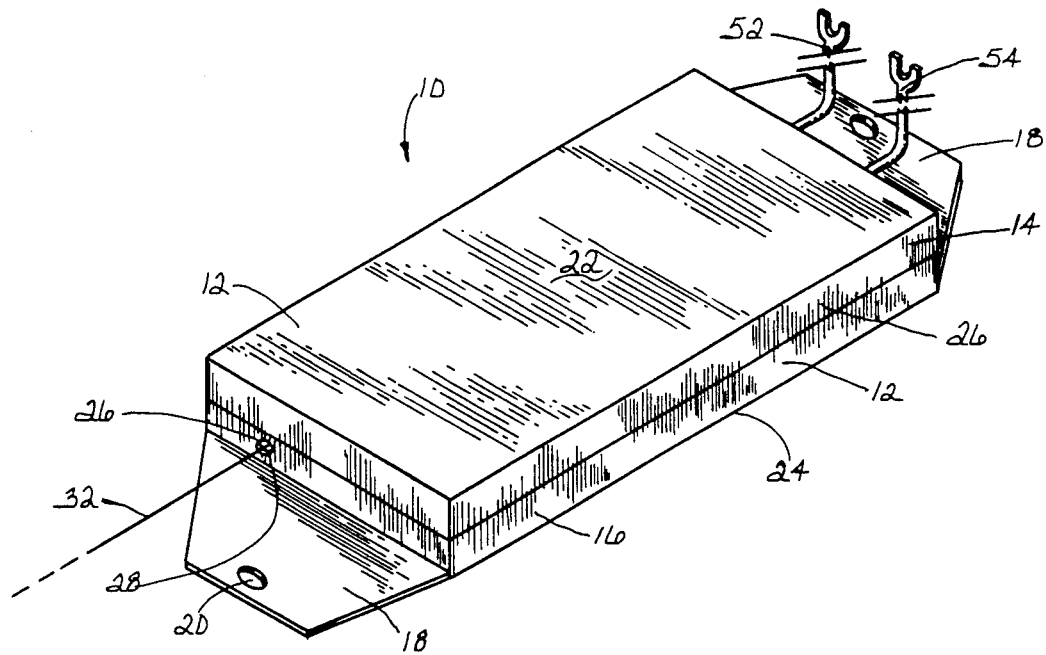
FIG. 1 is a perspective view of an embodiment of the remote alarm module of the invention.
Figure 2:
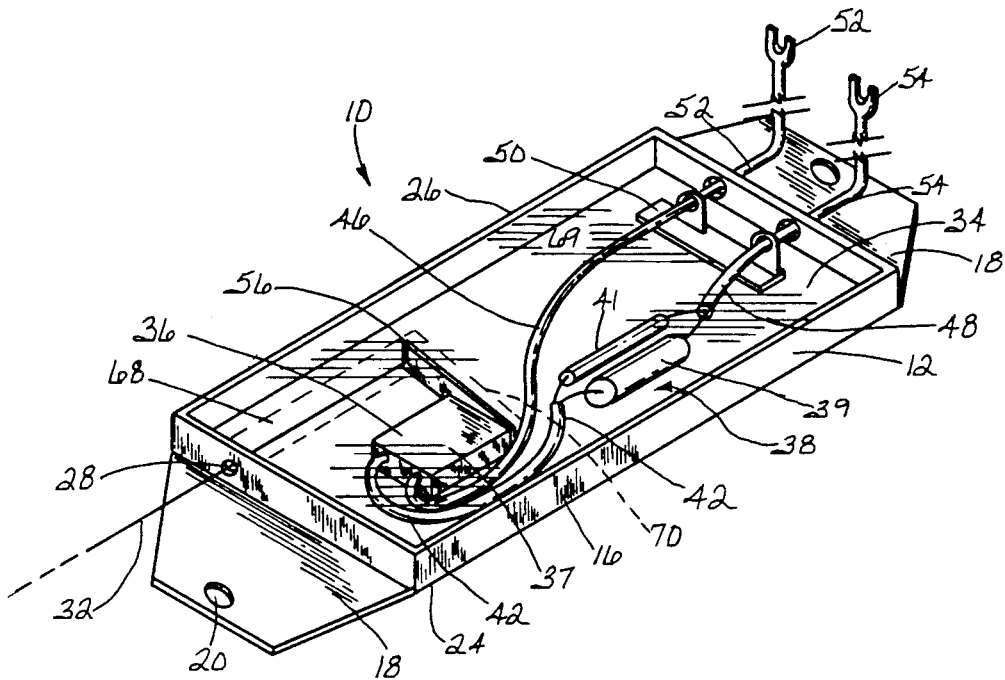
FIG. 2 is a perspective view of the remote alarm module of FIG. 1 with the cover portion of the base deleted.

The remote alarm module 10 of the invention has a base 12, which will vary depending upon a particular use. In FIGS. 1 and 2, a base 12 is illustrated, which is useful for a remote alarm module 10 used to protect vehicle hood ornaments or a number of other removable vehicle parts. The invention is not limited to the base 12 illustrated nor to the specific embodiment described. Base 12 has a cover 14 and a bottom 16. It is convenient, that base 12 include means for attaching remote alarm module 10 to the structure of the vehicle or the like (not shown), such as flanges 18, which extend out from bottom 16, and include holes 20 through which fasteners (not shown) may be passed to attach the remote alarm module 10.

Base 12 is rigid and strong and may be made of an insulating material such as any of the readily available highly durable moldable plastic materials. Base 12 supports, provides protection from water, dust and the like and allows rigid mounting to the vehicle. In order to permit use in limited space and to reduce the obstruction presented by a remote alarm module 10 of the invention, the module 10 may have the shape of a flanged, short, rectangular or roughly rectangular box. In that specific embodiment, top 22 and bottom 24 are much larger in area that any of sides 26.

Within one side 26 of base 12 is an opening 28, through which extends a line 32, which, in a particular embodiment, has a cross-sectional diameter about half the diameter of opening 28. Line 32 extends from a connection site 27 on an item to be protected 33, through opening 28 and into the interior 34 of base 12. Line 32 is desirably light-weight, strong and small in diameter. Line 32 may be connected to the movable item 33 by a variety of means. Line 32 may, for example, be tied to movable item 33, by wrapping line 32 around item 33 three times and then securing line 32 with two half hitches or a square knot.

In a specific embodiment of the invention, line 32 may be monofilament fishing line or the equivalent. In addition to providing an easily installed single filament and good strength for its size and weight, monofilament fishing line is resistant to a sharp pull applied to the line, like the pull of a fish striking a bait. Monofilament fishing lines of nominal 15-50 pound test are examples of a useful line 32.

Within interior 34 of base 12 is a switch 36 and a transient generator 38. The body 37 of switch 36 is rigidly mounted to base 12. Switch 36 has a first terminal 40 which is electrically connected to transient generator 38 by conductor 42. Switch 36 has a second terminal 44 which is electrically connected to a grounding conductor 46. Transient generator 38 is connected to a power conductor 48. In a particular embodiment of the remote alarm module 10 of the invention, conductors 46, 48 are electrically connected through a terminal strip 50 to a ground lead 52 and a power lead 54, respectively, which extend out from base 12.

In an alternative embodiment of the remote alarm module 10 of the invention, grounding could be provided through base 12 of a conductive material such as metal and/or by ground lead 52 being connected to the vehicular body by a grounding screw extending through hole 20. Ground lead 52 is, however, more desirable since ground lead 52 permits base 12 to be located where a fastener extending through hole 20 either would not be grounded or would be subject to loss of grounding due to corrosion or the like.

Figure 3:
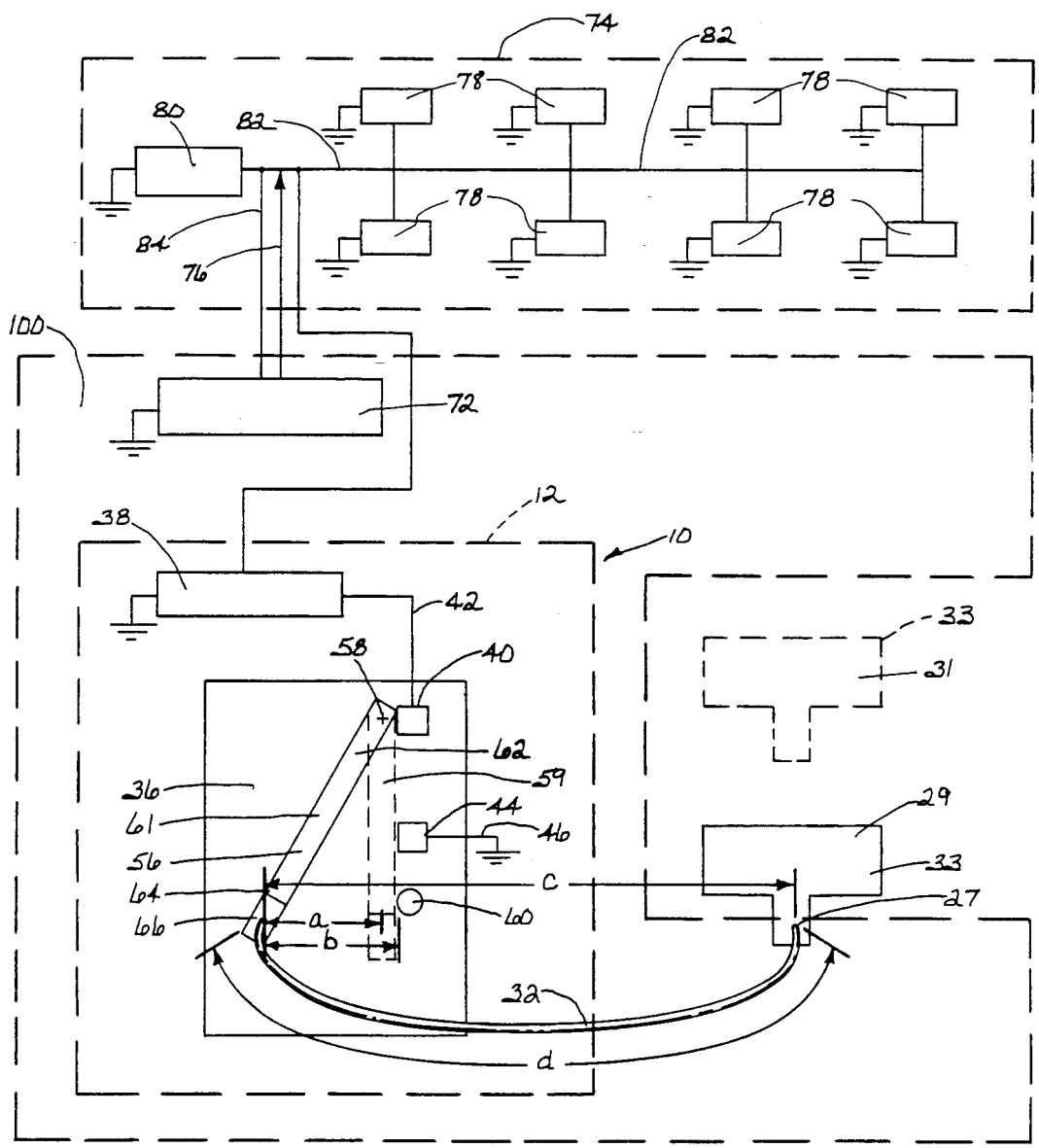
FIG. 3 is a diagrammatical drawing of an embodiment of the alarm system of the invention.

Switch 36 is closed by the rotation of lever 56, through an arc of rotation "a" which defines a pivot axis 58. Switch 36 moves between a first position 59, illustrated by dashed lines in FIG. 3, in which terminals 40, 44 are in electrically connective relationship, and a second position 61, illustrated by solid lines in FIG. 3, in which lever 56 is rotated fully away from first position 59. The configuration of contacts within switch 36 is not illustrated and may vary. A desirable arc of rotation "a" is less than about 45°. It is desirable that switch 36 be a momentary contact switch biased normally open. In a particular embodiment of the invention, it is desirable that axis 58 be generally perpendicular to a plane (not illustrated) defined by the two largest dimensions of remote alarm module 10 and that switch 36 have a thickness in a direction parallel to pivot axis 58 less than the other two dimensions of switch 36 and as small as possible. This is desirable because it permits the thickness of remote alarm module 10, that is the smaller dimension of sides 26, to be minimized. Microswitches are available for use as switch 36, which have these desired characteristics.

Lever 56 has an inner end 62, adjacent pivot axis 58, and an outer end 64 which includes a line receiver 66. Line 32 is attached at line receiver 66 and line receiver 66 is adapted to hold line 32. For example, in a specific embodiment of the invention in which line 32 is monofilament, line receiver 66 may be a section of outer end 64 having a perforation, to which the monofilament line 32 can be tied. Alternatively, line 32 and line receiver 66 could have mating parts, which could be joined together, or line receiver 66 could be a section of outer end 64 sized and shaped to hold line 32 by means of an adhesive.

Remote alarm module 10 of the invention includes a stop 60 rigidly attached to base 12. Stop 60 may be a portion of switch 36 or may be separate from switch 36. Stop 60 is positioned adjacent line receiver 66 when lever 56 is in first position 59 and restricts rotation of lever 56 in a direction of rotation from the second position 61 toward or beyond first position 59, to an arc of rotation "b". This arc of rotation "b" may be the same as arc of rotation "a" or slightly larger. In this embodiment of the invention, stop 60 and lever 36 are stronger than contacts of switch 36; that is, more able to resist without inelastic deformation or breakage, a pull applied to lever 56. This prevents damage to switch 36 when line 32 is pulled, and thus allows use of a lightly made, very sensitive switch 36. Line 32 may also be selected such that line 32 will break before damage would be caused to switch 36 by the pull on line 32.

Line 32 extends into interior 34 of base 12 along a passage or path 68, which is generally free of obstruction and desirably tangent to arc of rotation "a". In a specific embodiment of the invention, as illustrated in FIG. 2, the interior 34 of base 12 is generally filled, in whole or in part, with a thermoset polymeric filler material 69, which provides insulation, protection from water, dust and the like, cushioning against vibration, and a deterance to tampering. In FIG. 2, this material is illustrated, for the sake of clarity, as being transparent. Path 68 is not occupied by filler 69 nor is a lever cavity 70, which allows for rotation of lever 56.

It is undesirable for switch 36 to be actuated by acceptable movement of item 33, that is motion due not to attempted theft or other unauthorized event, but rather to ordinary background events, such as passing traffic, wind, and perching songbirds. Movement of site 27 over less than a selected free play distance, that is, acceptable movement of movable item 33, is not transmitted by line 32 .o lever 56, because of the distance that must be traveled by line receiver 66 in moving from second position 61 to first position 59 and because of slack in line 32. Movable item 33 is illustrated graphically in FIG. 3, in solid lines, in a rest position 29 in which movable item 33 is mounted and immobile; and in dashed lines, in a dismounted position 31, in which connection site 27 on movable item 33 is displaced over a distance greater than the free play distance, that is, a position occupied by item 33 after unacceptable movement. Movement of the hood ornament or other movable item 33 in excess of the free play distance, first tightens line 32 between movable item 33 and lever 56, then further movement of hood ornament 33, with sufficient force to overcome the biasing of lever 56, moves lever 56 from second position 61 in which terminals 40, 44 of switch 36 are not in electrical contact to a first position 59 in which terminals 40, 44 are in electrical contact.

Line 32 connecting to movable item 33 and line receiver 66, has a length "d" greater than a distance "c" separating line receiver 66 and connection site 27, when lever 56 is in second position 61 and item 33 is in at rest position 29, that is its static position. Slack length of line 32 can be defined as equal to the difference between dimension "d" and dimension "c". The sum of the slack length and the travel of line receiver 66 over arc of rotation "a" equals the free play distance. It is desirable that dimension "a" be between about two and about six times the slack length, or more desirably, about four times the slack length. In a particular embodiment, in which item 33 is a hood ornament, a desirable slack length is about 1/16 inch and a desirable dimension "a" is about ¼ inch.

Transient generator 38 can be composed of a very large variety of electrical components, including, for example, a light bulb, however, most such components are undesirable because they fail to minimize the load on monitored electrical system 74 presented by remote alarm module 10 of the invention after an electric transient is generated and the alarm unit 72 is triggered. In electrical systems such as that of a vehicle, electrical power is always at a premium and this is particularly the case after the alarm unit 72 has been triggered actuating a horn or siren. The transient generator 38 in a particular embodiment of the invention, therefore desirably generates only a single transient each time switch 36 is actuated, whether or not switch 36 remains actuated. The transient generator 38 of that embodiment of the remote alarm module 10 of the invention, has a capacitive circuit element, such as a capacitor 39 and a resister 41 electrically connected in parallel, to conductors 42, 48. In an example of a transient generator 38, capacitor 39 has a capacitance of about 15 microfarads and resistor 41 has a resistance of about 1000 ohms, a power rating of about ¼ to about ½ watt and a tolerance of about 10%.

The charging of capacitor 39 after the closing of switch 36 causes an electric transient or "spike" which is detected by alarm monitor 72. In the embodiment of the remote alarm module 10 of the invention illustrated in FIGS. 1-3, switch 36 is electrically positioned between transient generator 38 and ground. In an alternative embodiment of the remote alarm module 10 of the invention, switch 36 is electrically connected between transient generator 38 and the monitored electrical system 74. This may, however, be less desirable than the embodiment of remote alarm module 10 illustrated in FIGS. 1-3, which, besides limiting the drain on battery 80 of the monitored electrical system 74, after one or more remote alarm modules 10 are actuated and the alarm unit or monitor 72 is triggered, also limits the electrical drain upon battery 80 if accidental grounding should occur in conductor 42 or switch 36.

Resistor 41 within transient generator 38 serves to shunt capacitor 39. This prevents capacitor 39 from maintaining a charge after remote alarm module 10 has been actuated and alarm monitor 72 has been reset to detect subsequent transients.

While simplicity is in and of itself a desirable feature, transient generator 38 need not be as simple as the capacitor and resistor illustrated in FIG. 2. For example, an electrical delay circuit, which is conventional and known to the art, could be added in transient generator 38, if desired.

The alarm system 100 of the invention has an alarm unit 72 of the electric transient monitoring type and one or more remote alarm modules 10 of the invention. The alarm system 100 may also include other components compatible with the alarm unit 72, such as a remote on/off switch. There is no particular limit to the number of remote alarm monitors 10, which may be included in alarm system 100. Alarm system 100 monitors electric transients within a monitored electrical system 74, as indicated diagramatically by arrow 76 in FIG. 3.

The monitored electrical system 74 includes a power source, such as a battery 80 connected to alarm unit 72 by a conductor 84, and one or more components 78 connected by a main electrical circuit 82. Each component 78 is capable of generating a transient. Examples of components 78 in the electrical system of, for example, an automobile, and the courtesy lights activated by opening a door, the ignition system, and the headlights. Alarm unit 72 is configured so as to react to electric transients generated by a component 78 or remote alarm module 10 but not to electrical noise and the like within the main electrical circuit 82.

Alarm unit 72 need not be capable of differentiating between electric transients generated by different remote alarm modules 10 of the invention, however, within the scope of the invention is an alarm system 100 which includes several remote alarm modules 10, each of which is capable of generating an individualized electric transient and an alarm unit 72 which is capable of detecting and differenciating transients. The detection and generation of electric transients having such selected characteristics is within the skill of the art.

In operation, the alarm system 100 of the invention is, for example, located within a vehicle. Alarm unit 72 is installed so as to detect electric transients within the monitored electrical system 74 and one or more remote alarm modules 10 are connected to movable items 33. One of the movable items 33 is a hood ornament and line 32 is connected to a connection site 27 on whichever part of the hood ornament, the spring (not illustrated) or the body (not illustrated) moves the easiest. Other examples of movable items 33 are headlights, outboard mounted spare tires, and truck caps. The base 12 of each remote alarm module 10 is separated from its respective item 33. The remote alarm module 10 of the invention may be used not only to protect items which a thief would remove, such as a hood ornament, but also to protect against unauthorized movement, for example, the opening of a tool bin mounted in a pick-up truck.

An unacceptable movement of item 33 causes switch 36 to close. This results in the generation of a transient, by causing, for example in a particular embodiment of the invention, a potential to develop across capacitor 39. The charging of capacitor 39 creates a transient within the monitored electrical system 74 which is detected by alarm monitor 72 which is tripped. An event such as the sounding of a siren, controlled by alarm unit 72 then occurs. If that event fails to occur by reason of alarm unit 72 being deactivated or defective or alternatively if that event fails to deter the wrongdoer, item 33 is removed by the wrongdoer and line 32 is stretched and finally broken. The hood ornament 33 is lost but the remote alarm module 10 of the invention is not damaged, nor does the module 10 cause additional damage to be inflicted upon the hood or other portion of the vehicle in an attempt to free item 33.

While there have been described above the principles of the invention in connection with a specific embodiment, this description is made only by way of example and not as a limitation upon the scope of the claims.

What is claimed is:

1. A remote alarm module comprising a base, said base defining a line passage, a transient generator, said transient generator generating a single electric transient following the connection of said transient generator to an electric circuit, a normally open switch, said switch being joined to said base in registry with said passage, said switch being connected electrically in series with said transient generator, said transient generator and said switch having terminals for connecting the same to said electric circuit, said switch being connected to a line receiver, said line receiver joining said passage, said line receiver moving said switch between a second position wherein said terminals are electrically isolated from each other and a first position wherein said terminals are in an electrically conductive relationship, said base completely encasing said transient generator and said switch except for said passage defined by said base, said passage extending through said base, said passage being linearly related to said line receiver.

2. The remote alarm module of claim 1 wherein said switch is biased toward said second position.

3. The remote alarm module of claim 1 wherein said switch has an actuating lever, said lever having an inner and an outer end, said inner end being pivotably connected to said switch, said outer end having said line receiver thereon, said lever pivoting between said first and second positions.

4. The remote alarm module of claim 3 wherein said passage is at least generally tangent to the arc of rotation defined by said pivoting of said lever.

5. The remote alarm module of claim 3 further comprising a stop rigidly related to said base, said stop being disposed to deter pivoting of said lever, in a direction from said second position toward said first position, in excess of a preselected arc of rotation.

6. The remote alarm module of claim 3 wherein the arc of rotation of said lever from said second position to said first position is less than about 45°.

7. The remote alarm module of claim 3 further comprising filler occupying otherwise unoccupied space within said base, said filler being discrete from said passage and a lever cavity, said lever cavity being dimensioned to permit said pivoting of said lever.

8. The remote alarm module of claim 3 wherein said switch has a smallest dimension in a direction parallel to the axis of an arc of rotation defined by said pivoting of said lever.

9. The remote alarm module of claim 1 wherein said transient generator is a capacitive circuit element.

10. The remote alarm module of claim 9 wherein said transient generator further comprises a capacitor and a resistor shunting said capacitor.

11. The remote alarm module of claim 1 further comprising a monofilament line joined to said line receiver, along said passage.

12. A remote alarm module for protecting at least one movable item mounted to a vehicle in association with an alarm unit which detects transients in a monitored electrical system comprising: a base, a transient generator a switch, said switch being spaced apart from said item, said switch having a line receiver, said line receiver being movable from a second position to a first position, said switch being actuated by said movement of said lien receiver from said second position to said first position, a plurality of conductors electrically connecting said transient generator and said switch in series and to ground and to said monitored electrical system, a line extending out from said line receiver to said movable item, said line having a length from said line receiver to said movable item greater than the distance separating said lien receiver in said second position and the at-rest position of said movable item.

13. The remote alarm module of claim 12 wherein said line has a length between said line receiver and said movable item less than the distance separating said line receiver in said second position and said movable item in any dismounted position.

14. The remote alarm module of claim 12 wherein said transient generator is a capacitive circuit element.

15. The remote alarm module of claim 12 wherein said transient generator further comprises a capacitor and a resistor shunting said capacitor.

16. The remote alarm module of claim 12 wherein said movement of said line receiver, is between about two and about six times the difference between the length of said line and the distance separating said line receiver in said second position and said movable item in said rest position.

17. An alarm system for use with a vehicle having one or more movable items to be protected and an electrical system, said alarm system comprising an alarm unit, said alarm unit detecting electrical transients in said electrical system, one or more remote alarm modules, said remote alarm modules each being electrically isolated from said alarm unit except through said electrical system, said remote alarm modules each having a transient generator and a switch, said switch being electrically connected in series with said transient generator, said switch having a lever pivotable between a second position and a first position to alter said switch between an open position and a closed position, said lever having a line receiver, and lines joining each of said line receivers and said respective movable items.

18. The alarm system of claim 17 wherein said transient generator is a capacitive circuit element.

19. The alarm system of claim 17 wherein said remote alarm modules are each mounted in the vicinity of and physically separated from a respective said movable item.

20. The alarm system of claim 17 wherein said lines each have a length from a respective said line receiver to a respective said movable item in excess of the distance separating said line receiver when said lever is in said second position and said movable item when said movable item is immobile by the amount of a selected slack distance.

21. An alarm system for use with a vehicle having one or more movable items to be protected and an electrical system, said alarm system comprising an alarm unit, said alarm unit detecting electrical transients in said electrical system, one or more remote alarm modules, said remote alarm modules each being electrically isolated from said alarm unit except through said electrical system, said remote alarm modules each having a switch, said switch being electrically connected in series with said alarm unit, said switch having a lever pivotable between a second position and a first position to alter said switch between an open position and a closed position, said lever having a line receiver, and lines joining each of said line receivers and said respective movable items.

22. A remote alarm module for protecting at least one movable item mounted to a vehicle in association with an alarm unit which detects transients in a monitored electrical system comprising: a base, a switch, said switch being spaced apart from said item, said switch having a line receiver, said line receiver being movable from a second position from a first position, said switch being actuated by said movement of said line receiver from said second position to said first position, a plurality of conductors electrically connecting said switch in series to ground and to said monitored electrical system, a line from said line receiver to said movable item, said line having a length from said line receiver to said movable item greater than the distance separating said line receiver in said second position and the at-rest position of said movable item.

* * * * *